United States Patent [19]

Loch

[11] 4,410,657
[45] Oct. 18, 1983

[54] PIGMENT PASTES AND THEIR USE

[75] Inventor: Werner Loch, Erpolzheim, Fed. Rep. of Germany

[73] Assignee: BASF Aktiengesellschaft, Fed. Rep. of Germany

[21] Appl. No.: 320,019

[22] Filed: Nov. 10, 1981

[30] Foreign Application Priority Data

Nov. 19, 1980 [DE] Fed. Rep. of Germany ....... 3043601

[51] Int. Cl.³ .............................................. C08K 5/06
[52] U.S. Cl. ............................... 524/548; 204/181 C; 524/376; 524/389
[58] Field of Search ............... 524/548, 808, 809, 425, 524/407, 451, 901, 389, 376, 516; 204/181 C; 106/308 M

[56] References Cited

U.S. PATENT DOCUMENTS 3,356,627 12/1967 Scott .................................... 524/516
3,492,253 1/1970 Katz et al. ........................... 260/17
3,708,290 1/1973 Verhille et al. ....................... 96/1.5
4,127,422 11/1978 Guzi, Jr. et al. .................. 106/308 Q

FOREIGN PATENT DOCUMENTS 1275029 of 0000 Fed. Rep. of Germany .

*Primary Examiner*—Paul R. Michl
*Attorney, Agent, or Firm*—Keil & Witherspoon

[57] ABSTRACT

Pigment pastes, comprising an organic solvent, a copolymer of one or more water-immiscible, or only partially water-miscible, copolymerizable α,β-olefinically unsaturated compounds and one or more water-soluble copolymerizable N-vinyl compounds, and a finely divided pigment and/or filler dispersed in the mixture of solvent and copolymer, are used for pigmenting organic and/or aqueous solutions or dispersions of surface-coating binders, for toning pigmented gloss finishes, and for pigmenting and toning anodic or cathodic electrocoating finishes.

8 Claims, No Drawings

PIGMENT PASTES AND THEIR USE

The present invention relates to pigment pastes and to their universal use for pigmenting surface-coating binders, for preparing pigmented gloss finishes for various end uses, and for pigmenting anodic or cathodic electrocoating finishes.

Pigmenting of clear finishes is substantially easier if the pigment is employed in the form of a paste which contains the said pigment in the requisite finely divided form. In such cases, the finish is obtainable by simple mixing of the milled paste with the mixture of binder and crosslinking agent, dissolved in a conventional surface-coating solvent, and this mixing requires only slight stirring, ie. no major mechanical stress is involved. Such pastes must, even at a high pigment content, still exhibit flow, ie. be pumpable, so that they can, in a paint factory, be conveyed through pipelines from one destination to another. Meeting both requirements simultaneously generally proves extremely difficult and can only be achieved-if at all-by using a high content of paste binder. This, however, frequently leads to incompatibility with the surface-coating binder and to poorer surface-coating properties, so that for each paint-mixing problem paste binders and pastes specifically suited to the binder have to be employed.

The universal pigment pastes which are miscible with the large number of available types of binders have long been sought. Ideally, only one paste would be required for each pigment, special hues would be obtainable by mixing the pastes, and the resulting paste mixtures would be easy to incorporate into all the many types of clear finishes. Given such universal compatibility, it would also be conceivable to incorporate different pigment pastes successively until the desired hue was obtained.

Belgian Pat. No. 538,633 describes vinyl propionate copolymers, with vinylpyrrolidone as one of the possible comonomers. Data concerning the ratios of the monomers are given in the Examples only. According to Example 6, the copolymer contains N-vinylcaprolactam and vinyl propionate as copolymerized units in amounts of 19.6 and 78.4% by weight respectively. These copolymers are intended, inter alia, for use as binders for dye concentrates and pigment print pastes, ie. in dyeing and printing technology, but are unsuitable for use in pourable, low-binder pigment pastes, which are used for pigmenting baking finishes for gloss coatings, and which must be compatible with all industrial surface-coating binder systems, including aqueous systems.

German Published Application DAS No. 1,275,029 describes paste binders for textile pigment printing which, in order to permit alkaline fixing to the fibers, must contain hydroxylic monomers, with a halogen atom vicinal to the OH group, as copolymerized units, examples of monomers additionally used to synthesize the polymer being vinyl propionate and small amounts of a water-soluble monomer, such as vinylpyrrolidone. However, the polymers described in this DAS are also not suitable binders for universally usable pigment pastes.

It is an object of the present invention to provide universally usable pigment pastes, and in particular pastes which can also be used with aqueous surface-coating binders.

I have found that this object is achieved by a pigment paste which essentially comprises:
- (A) from 20 to 85% by weight of one or more organic solvents,
- (B) from 0.1 to 20% by weight of a copolymer of
  - (a) from 10 to 75% by weight of one or more water-immiscible, or only partially water-miscible, copolymerizable $\alpha,\beta$-olefinically unsaturated compounds and
  - (b) from 25 to 90% by weight of one or more water-soluble copolymerizable N-vinyl compounds, and
- (C) from 10 to 79% by weight of one or more finely divided pigments or fillers, or a mixture of pigment and filler, dispersed in the mixture of (A) and (B), the sum of the percentages of (A), (B) and (C) being 100.

Preferably, the water-immiscible or only partially water-miscible copolymerizable $\alpha,\beta$-olefinically unsaturated compound (a) is a vinyl ester of a $C_2$-$C_{18}$-monocarboxylic acid and/or an acrylic acid ester or methacrylic acid ester of a $C_4$-$C_{18}$-monoalcohol, and the water-soluble copolymerizable N-vinyl compound (b) is N-vinylpyrrolidone.

The present invention further relates to the use of the novel pigment pastes for pigmenting organic and/or aqueous solutions or dispersions of surface-coating binders or binder mixtures, for toning pigmented gloss finishes, and for pigmenting or toning anodic or cathodic electrocoating finishes.

Surprising features of the novel pigment pastes are their stability and flow at low binder contents and high pigment contents, as well as their compatibility with organic and aqueous solutions of very diverse surface-coating binders, so that they are universally usable in paint factories.

The following details may be noted concerning the individual components of the novel pigment pastes:

(A) Component (A) is an organic solvent or solvent mixture which is present in the novel pigment pastes in a concentration of from 20 to 85% by weight, preferably from 30 to 80% by weight. Preferred organic solvents for this purpose are:
- (1) $C_2$-$C_4$-monoalkyl ethers of a monoalkylene glycol or oligoalkylene glycol, eg. of ethylglycol, butylglycol, butyldiglycol, 1-methoxypropan-2-ol and/or their acetates, for example ethylene glycol acetate,
- (2) aromatic and araliphatic hydrocarbons, eg. toluene, xylene and/or relatively high-boiling gasoline fractions rich in aromatics, and
- (3) other organic solvents or solvent mixtures conventionally employed in surface coatings, with the exception of purely aliphatic hydrocarbons.

Mixtures of the solvents mentioned under (1) and (2) are particularly advantageous.

(B) Component (B) is a copolymer which can be prepared by, for example, solution polymerization, is used in the novel pigment pastes in an amount of from 0.1 to 20% by weight, preferably from 3 to 8% by weight, and contains, as copolymerized units,
- (a) from 10 to 75% by weight, preferably from 20 to 40% by weight, of one or more water-immiscible, or only partially water-miscible, copolymerizable, $\alpha,\beta$-ethylenically unsaturated compounds and (b) from 25 to 90% by weight, preferably from 60 to 80% by weight, of one or more water-soluble copolymerizable N-vinyl compounds.

The sum of the percentages of (a) and (b) is 100.

Preferred water-immiscible or only partially water-miscible, $\alpha,\beta$-ethylenically unsaturated compounds (a) are vinyl esters of a $C_2$–$C_{18}$-monocarboxylic acid, eg. vinyl acetate, vinyl propionate, vinyl pivalate, vinyl 2-ethylhexanoate and vinyl stearate, and/or acrylic acid esters or methacrylic acid esters of $C_4$–$C_{18}$-alcohols, eg. butyl acrylate, butyl methacrylate, 2-ethylhexyl acrylate, lauryl acrylate and octadecyl acrylate. Particularly preferred monomers are vinyl propionate and 2-ethylhexyl acrylate. Other, less preferred, examples of component (a) are water-insoluble or only slightly water-soluble derivatives of acrylamide or methacrylamide, vinyl ethers and/or vinyl-aromatics, such as styrene.

Examples of preferred water-soluble N-vinyl compounds (b) are N-vinylpyrrolidone, N-vinylpiperidone and N-vinylimidazole.

Component (B) can be prepared by conventional solution polymerization, preferably in such solvents as have been mentioned under A (1) and A (2).

The Fikentscher K value of component (B) is in general from 20 to 50, preferably from 25 to 40.

(C) Component (C) is an inorganic or organic pigment conventionally used in surface coatings, a filler or a mixture of pigment and filler, finely dispersed in the mixture of components (A) and (B) and present in the novel pigment pastes in an amount of from 10 to 79% by weight, preferably from 15 to 70% by weight.

Preferred inorganic pigments and fillers are titanium dioxide, chromium oxide, chromates, iron oxides, iron complexes, molybdate pigments, zinc sulfide, barium sulfate, chalk and talc; preferred organic pigments are carbon black, phthalocyanine derivatives, perylene derivatives, quinacridone derivatives, flavanthrone derivatives, anthrapyrimidine derivatives and pyranthrone derivatives. Of course, mixtures of the said pigments and fillers can also be used in order to obtain specific hues.

The sum of the percentages of (A), (B) and (C) is 100.

The novel pigment pastes can furthermore contain minor amounts of other assistants conventionally used in surface coatings, such as flow control agents, wetting agents, anti-foam agents, neutralizing agents, dispersants, thixotropic agents and anti-settling agents.

A pigment paste according to the invention may be prepared, for example, by working component (C) into a paste, preferably with a 1–10% strength by weight solution of copolymer (B) in solvent (A), wet-milling the paste by one of the methods conventionally used in surface-coating technology, and in this way finely dispersing (C) in the mixture of (A) and (B); advantageously, a dissolver or similar mixing unit is employed for preparing the paste. Preferred dispersers are shaking machines, for example the Red Devil from Erichsen, agitated ball mills, sand mills and the like; for rheological reasons, a closed milling apparatus is preferred. Other conventional surface-coating auxiliaries which may also be used can be incorporated into the mixture even before dispersing the pigment.

The pigments and/or fillers (C) present in the novel pigment pastes after dispersing in general have a particle size of less than 15 $\mu$m, according to DIN 53,203. The pastes can have solids contents of, for example, from 15 to 80% by weight, preferably from 20 to 70% by weight; they remain pourable after storage for a week or more, and show virtually no tendency to settle out. They can be pmped, and can accordingly also be readily handled in closed pipeline circuits.

The novel pigment pastes exhibit universal compatibility and can therefore be mixed with very diverse types of surface-coating binders, for example acrylate resins, saturated and unsaturated polyester resins, alkyd resins, epoxy resins, isocyanate resins, polyurethane resins and aminoplast resins, as well as with all conceivable intramolecular and intermolecular combinations of these, the resins or resin combinations generally being dissolved in one of the solvents mentioned under (A). In the majority of cases, aqueous binders, in the form of aqueous solutions or dispersions free from organic solvents, can also be used. In this way water-dilutable finishes which do not pollute the environment, and which contain varying proportions of co-solvent, are obtained.

The paste is mixed with the amount of binder or binder mixture which corresponds to the desired volumetric concentration of pigment. As a rule, the binder is added to the paste, but the converse sequence can also be used. Mixing is preferably effected with a high-speed stirrer, through speeds of 2,000 rpm are more than adequate. Any conventional surface-coating auxiliaries which are to be used are preferably added during mixing. The resulting finishes can be diluted to the desired use viscosity with the conventional organic solvents mentioned under (A), and in most cases also with water, and exhibit the usual level of stability.

To obtain specific hues, the novel pigment pastes can also be mixed with one another in the requisite ratio, and then mixed with the binder. Pastes prepared using different copolymers (B) are fully compatible with one another. Finally, it is also possible to tone a finish by subsequent incorporation of small amounts of a pigment paste according to the invention.

The finishes obtained can be applied to a great variety of substrates, for example paper, wood, glass, ceramics, leather, plastics and metals. The preferred substrate is metal. The novel pigment pastes may be used, for example, to formulate primers, fillers and top lacquers for automobile bodywork. Lacquers suitable for coil coating can also be obtained by mixing the pastes with appropriate binders.

The finishes can be applied by conventional methods, such as brushing, knife-coating, spraying, roller-coating, pouring or printing, and, where the novel pigment pastes are combined with aqueous solutions or dispersions of surface-coating binders and binder mixtures, anodic or cathodic electrocoating can also be employed. Depending on the particular formulation, the coatings can be hardened by physical and/or oxidative drying, or by chemical reaction, either at room temperature or, in the majority of cases, at an elevated temperature, such as is conventionally employed for the purpose. The coatings obtained exhibit good resistance to climatic conditions and good technological properties, equivalent to those obtained with finishes produced by direct milling, ie. the properties are unaffected by the presence of the paste binder (B).

The Examples which follow illustrate the present invention without implying any limitation thereof. Parts and percentages are by weight, unless stated otherwise.

EXAMPLE 1

(a) Preparation of the paste binder 200 parts of ethylene glycol monobutyl ether are heated to 90° C. in a reaction vessel. A mixture of 396 parts of N-vinylpyrrolidone, 204 parts of vinyl propionate and 1.2 parts of azo-bis-isobutyronitrile is then added dropwise in the course of 2 hours. Finally, polymerization is completed by allowing 1 hour at 90° C. The solution polymer obtained has a Fikentscher K value of 24.

The solids content of the copolymer solution is 76%.

(b) Preparation of a white paste 800 parts of titanium dioxide are worked into a paste with a mixture of 53 parts of the copolymer of Example (1a) and 348 parts of ethylene glycol monobutyl ether, and the paste is dispersed with 1,200 parts of steel balls for 2 hours in a shaking mixture (for example a Red Devil). The white paste obtained after separating off the steel balls has the following characteristics:

seediness according to DIN 53,203: <7 μm
solids content: 69.7%
pigment content: 66.7%
binder content: 3.3%

(c) Preparation of a blue paste 1.9 parts of copper phthalocyanine are worked into a paste with a mixture of 0.7 part of the polymer of Example (1a) and 9.4 parts of ethylene glycol monobutyl ether, using a high-speed stirrer. The mixture is then passed twice through a continuous-flow agitated ball mill, at a throughput of about 8 l/h. Steel balls are used as the grinding medium. The blue paste obtained has the following characteristics:

seediness according to DIN 53,203: <15 μm
solids content: 20.0%
pigment content: 15.8%
binder content: 4.4%

(d) Preparation of a yellow paste 20 parts of 1,9-anthrapyrimidine-2-carboxylic acid (α-anthraquinolylamide) are worked into a paste with a mixture of 6.6 parts of the polymer of Example (1a), 5.7 parts of ethylene glycol monobutyl ether and 87.7 parts of xylene, and the paste is dispersed with 300 parts of steel balls for 2 hours in a shaking machine (for example a Red Devil). The yellow paste obtained after separating off the steel balls has the following characteristics:

seediness according to DIN 53,203: <10 μm
solids content: 20.8%
pigment content: 16.7%
binder content: 4.2%

(e) Preparation of a black paste 64.5 parts of bone black are worked into a paste with a mixture of 19.7 parts of the polymer of Example (1a) and 130.3 parts of ethylene glycol monobutyl ether, and the paste is dispersed with 300 parts of steel balls for 6 hours in a shaking machine. The black paste obtained after separating off the steel balls has the following characteristics:

seediness according to DIN 53,203: <15 μm
solids content: 36.5%
pigment content: 30.1%
binder content: 7.0%

EXAMPLE 2

(a) Preparation of the paste binder 490 parts of isobutanol are heated to 90° C. in a reaction vessel. A mixture of 450 parts of N-vinylpyrrolidone, 150 parts of 2-ethylhexyl acrylate and 1.2 parts of azo-bis-isobutyronitrile is then added dropwise in the course of 2 hours. Polymerization is then completed by allowing 1.5 hours at 90° C. The solution polymer obtained has a Fikentscher K value of 28. The product is continuously transferred into xylene by distillation under reduced pressure with simultaneous addition of xylene.

Solids content: 50%

(b) Preparation of a white paste 240 parts of titanium dioxide are worked into a paste with a mixture of 21.7 parts of the polymer of Example (2a) and 78.3 parts of xylene, and the paste is dispersed with 300 parts of steel balls for 2 hours in a shaking machine (for example a Red Devil). The white paste obtained after separating off the steel balls has the following characteristics:

seediness according to DIN 53,203: <7 μm
solids content: 73.6%
pigment content: 70.6%
binder content: 3.2%

(c) Preparation of a blue paste 31 parts of copper phthalocyanine are worked into a paste with a mixture of 29.6 parts of the polymer of Example (2a) and 170.4 parts of xylene, and the paste is dispersed with 300 parts of steel balls for 2 hours in a shaking machine (for example a Red Devil). The blue paste obtained after separating off the steel balls has the following characteristics:

seediness according to DIN 53,203: <15 μm
solids content: 19.9%
pigment content: 13.4%
binder content: 6.5%

EXAMPLE 3

(a) Preparation of the paste binder 167 parts of ethylene glycol monobutyl ether are heated to 90° C. in a reaction vessel. A mixture of 375 parts of N-vinylpyrrolidone, 125 parts of 2-ethylhexyl acrylate and 1 part of azo-bis-isobutyronitrile is then added dropwise in the course of 2 hours. Shortly before the end of the addition, the mixture is diluted to 65% solids content with 102 parts of ethylene glycol monobutyl ether, and polymerization is then completed by allowing one hour at 90° C. After completion of the reaction, the solution polymer obtained is diluted to 10% solids content with an aromatic gasoline fraction (boiling point 185°–200° C.). The polymer has a Fikentscher K value of 33.

(b) Preparation of a white paste 800 parts of titanium dioxide are worked into a paste in 400 parts of the 10% strength polymer solution of Example (3a), using a high-speed stirrer, and the mixture is then passed once through an agitated ball mill, as in Example (1c), using alumina beads as the grinding medium. The white paste obtained has the following characteristics:

seediness according to DIN 53,203: <10 μm
solids content: 69.8%
pigment content: 66.7%
binder content: 3.3%

EXAMPLE 4

Toned pastes (a) Preparation of a gray paste 232.2 parts of the white paste of Example (1b) and 109.6 parts of the black paste of Example (1e) are mixed by stirring. The resulting gray paste shows no coarsening (flocculation) and has the following characteristics:

solids content: 58.5%
pigment content: 55.0%
binder content: 4.5%

In place of the white paste of Example (1b), those of Examples (2b) and (3b) can be employed, given due attention to the slightly different pigment contents.

(b) Preparation of a modified blue paste 102.6 parts of the blue paste of Example (1c), 9.7 parts of the white paste of Example (1b) and 18.3 parts of the black paste of Example (1e) are mixed by stirring. The resulting modified blue paste shows no coarsening (flocculation) and has the following characteristics:

solids content: 26.0%
pigment content: 21.6%
binder content: 4.7%

Instead of the blue paste of Example (1c), that of Example (2c) can be used, and in place of the white paste of Example (1b), those of Example (2b) or (3b) can be used, given due attention to any differences in pigment content.

(c) Preparation of a green paste 11.8 parts of the blue paste of Example (1c), 23.7 parts of the white paste of Example (1b) and 113.3 parts of the yellow paste of Example (1d) are mixed by stirring. The resulting green paste shows no coarsening (flocculation) and has the following characteristics:

solids content: 28.1%
pigment content: 24.6%
binder content: 4.1%

Instead of the blue paste of Example (1c), that of Example (2c) can be used, and in place of the white paste of Example (1b), those of Example (2b) or (3b) can be used, given due attention to the slight differences in pigment content.

EXAMPLE 5

Preparation of finishes

The finishes described below can be prepared successfully with any of the pigment pastes of Examples 1 to 4, given due attention to the desired volumetric pigment concentration, and are therefore to be regarded as merely illustrative:

(a) Preparation of a green finish 263 parts of a mixture of 60 parts of a commercial short-oil non-drying alkyd resin having an acid number of about 20 and an OH number of about 90, 12 parts of a commercial partially etherified reactive melamine-form-aldehyde resin, 35 parts of xylene and 10 parts of butanol are added to 200 parts of the green paste of Example (4c). The resulting mixture is homogenized for one minute with a high-speed stirrer running at 2,000 rpm. The finish obtained is diluted to spray viscosity with xylene, sprayed onto metal sheets and baked for 30 minutes at 130° C. Very glossy films are obtained, with properties which fully correspond to those obtained with a composition produced by direct milling of the pigments in the clear finish mentioned above.

(b) Preparation of a white finish 200 parts of the white paste of Example (3b) are mixed for one minute with 255 parts of a mixture of 55 parts of a commercial polyacrylate resin, having an acid number of about 80 and a Fikentscher K value of about 25, 14 parts of a commercial partially etherified reactive melamine-formaldehyde resin and 50 parts of isobutanol, using a high-speed stirrer running at 2,000 rpm. The resulting finish is knife-coated onto metal sheets and baked for 30 minutes at 130° C. Very glossy coatings are obtained, having properties corresponding fully to those obtained with the directly pigmented clear finish mixture.

(c) Preparation of a gray finish 200 parts of the gray paste of Example (4a) are stirred for one minute with 277 parts of a mixture of 50 parts of a commercial saturated polyester, having an acid number of about 35, an OH number of about 75 and a Fikentscher K value of about 15, 12.5 parts of a commercial fully etherified melamine-formaldehyde resin and 50 parts of isobutanol, using a high-speed stirrer running at 2,000 rpm. The resulting finish is diluted to spray viscosity with ethylene glycol monobutyl ether, sprayed onto metal sheets and baked for 30 minutes at 150° C. Glossy coatings are obtained, having the same properties as those found for a finish produced by direct milling.

(d) Preparation of a blue finish 200 parts of the blue paste of Example (4b) are mixed for one minute with 363 parts of a mixture of 57 parts of a commercial benzoic acid-modified short-oil alkyd resin, having an acid number of about 15 and an OH number of about 60, 11.4 parts of a commercial, partially etherified, reactive melamine-formaldehyde resin, 17 parts of an aromatic gasoline fraction of boiling range 185°–200° C. and 20 parts of mineral spirit, using a high-speed stirrer running at 2,000 rpm. The resulting finish is applied (if necessary after dilution with the above aromatic gasoline fraction) to metal sheets and is baked for 30 minutes at 140° C. The coatings obtained are very glossy and exhibit the same properties as coatings obtained with a corresponding directly pigmented clear finish mixture.

I claim:

1. A pigment paste, essentially comprising
   (A) from 20 to 85% by weight of one or more organic solvents,
   (B) from 0.1 to 20% by weight of a copolymer of
      (a) from 10 to 75% by weight of one or more water-immiscible, or only partially water-miscible, copolymerization $\alpha,\beta$-olefinically unsaturated compounds and
      (b) from 25 to 90% by weight of one or more water-soluble copolymerizable N-vinyl compounds selected from the group consisting of N-vinylpyrrolidone, N-vinylpiperidone and N-vinylimidazole, and
   (C) from 10 to 79% by weight of one or more finely divided pigments or fillers, or a mixture of pigment and filler, dispersed in the mixture of (A) and (B), the sum of the percentages of (A), (B) and (C) being 100.

2. A pigment paste defined in claim 1, wherein the organic solvent (A) is a $C_2$–$C_4$-monoalkyl ether of ethylene glycol, and/or the monoacetate thereof.

3. A pigment paste defined in claim 1, wherein the organic solvent (A) is an aromatic hydrocarbon and/or a relatively high-boiling gasoline fraction rich in aromatics.

4. A pigment paste defined in claim 1, wherein component (a) present as copolymerized units in the copolymer (B) is a vinyl ester of a $C_2$–$C_{18}$-monocarboxylic acid and/or an acrylic acid ester or methacrylic acid ester of a $C_4$–$C_{18}$-monoalcohol.

5. A pigment paste defined in claim 1, wherein component (b) present as copolymerized units in the copolymer (B) is N-vinylpyrrolidone.

6. A process for pigmenting an organic and/or aqueous solution or dispersion of a surface-coating binder or binder mixture, wherein a pigment paste as defined in claim 1 is added to said binder.

7. A process for toning a pigmented gloss paint, wherein a pigment paste as defined in claim 1 is added to said paint.

8. A process for the preparation of a pigmented anodic or cathodic electrocoating finish, wherein a pigment paste as claimed in claim 1 is added to said electrocoating finish.

* * * * *